United States Patent [19]

Oberdörfer

[11] Patent Number: 5,009,247
[45] Date of Patent: Apr. 23, 1991

[54] PIPE INTERRUPTER

[75] Inventor: Hans Oberdörfer, Stuttgart, Fed. Rep. of Germany

[73] Assignee: Hansa Metallwerke AG, Stuttgart, Fed. Rep. of Germany

[21] Appl. No.: 425,944

[22] Filed: Oct. 24, 1989

[30] Foreign Application Priority Data

Oct. 31, 1988 [DE] Fed. Rep. of Germany ....... 3837032

[51] Int. Cl.⁵ .............................................. F16K 24/02
[52] U.S. Cl. .................................. 137/218; 137/512.4; 137/801
[58] Field of Search ...................... 137/218, 512.4, 855, 137/801

[56]  References Cited
U.S. PATENT DOCUMENTS

| | | | |
|---|---|---|---|
| 2,302,150 | 11/1942 | Sloan et al. | 137/218 |
| 2,302,151 | 11/1942 | Sloan et al. | 137/218 |
| 2,378,613 | 6/1945 | Young et al. | 137/855 |
| 2,449,573 | 9/1948 | White | 137/218 |
| 2,877,789 | 3/1959 | Campbell . | |
| 3,207,171 | 9/1965 | Kryman | 137/218 |
| 3,460,558 | 8/1969 | Johannisson | 137/102 |
| 4,080,981 | 3/1978 | Stewart | 137/218 |
| 4,217,921 | 8/1980 | Gidner | 137/218 |
| 4,508,136 | 4/1985 | Kah | 137/218 |
| 4,827,538 | 5/1989 | Heimann et al. | 137/217 X |

Primary Examiner—Gerald A. Michalsky
Attorney, Agent, or Firm—Fred Philpitt

[57] ABSTRACT

A pipe interrupter, which is particularly suitable for installation in a sanitary fitting, comprises in a housing a chamber, into which a water inlet pipe, a water outlet pipe and a ventilating passage open. A resilient closing flap comprises an attachment section as well as a closing section connected thereto in the manner of a hinge. Normally, as long as reduced pressure does not prevail in the inlet pipe, the closing section covers the opening aperture of the ventilation passage into the chamber, so that on the one hand no atmospheric air may enter and on the other hand no water may emerge. However, if a reduced pressure occurs in the pipe system, which is connected to the inlet pipe, then the closing section of the closing flap tilts by a certain angle, until it closes off the opening point of the inlet pipe into the chamber and on the other hand opens the ventilation passage to the chamber. In this way, water can no longer flow back into the inlet pipe and to the pipe system connected thereto; on the other hand, the waterways connected after the chamber are ventilated. Sucking-back of contaminated water into the drinking water system, which is connected to the inlet pipe, is thus reliably prevented. The dimensions of the pipe interrupter are small so that it can be located in particular in the base region of known sanitary fittings. (FIG. 1)

3 Claims, 2 Drawing Sheets

PIPE INTERRUPTER

The invention relates to a pipe interrupter for sanitary installations, in particular for installation in a sanitary fitting, with
(a) a housing;
(b) a chamber in the housing, into which open:
(ba) an inlet pipe for water;
(bb) an outlet pipe for water;
(bc) a ventilation passage;
(c) a closing member in the chamber, which at the time of reduced pressure in the inlet pipe, closes the latter and opens the ventilation passage.

It is known that sanitary fittings exist which could endanger the quality of the drinking water if contaminated water is sucked back. These include in particular bath/ shower head sets with flexible hose showerheads or handbasin and sink fittings with a shower head flexible hose which can be pulled out. Fittings of this type must comprise safety devices, by which the sucking-back of contaminated water into the drinking water can be reliably prevented. Safety devices of this type normally comprise a pipe interrupter or ventilator.

A pipe interrupter of the type described above is known from DIN 3266, July 1966, FIG. 2. In this case provided coaxially to the water inlet pipe in the chamber of the housing is a connection, through which radial flow openings for the water are guided. Provided coaxially to the wall of this connection is an outer wall, which contains the openings for the admission of air. The resilient closing member is constructed as a hollow, cylindrical part, which without any throughflow of water bears against the inner connection and closes off the water flow openings, in this case simultaneously clears the air openings. As soon as water at excess pressure is present in the inlet pipe, the water presses the hollow, cylindrical closing member radially outwards, so that on the one hand the water passage into the chamber is released and on the other hand the air supply through the radial ventilation openings is closed.

However, the dimensions of this known pipe interrupter ("design A 2") are so great that it is poorly suited for installation in a sanitary fitting. Furthermore it has a relatively complicated construction.

It is the object of the present invention to develop a pipe interrupter of the aforementioned type so that it can be realised in the smallest space with low expenditure and is particularly suitable for installation in a sanitary fitting.

This object is achieved according to the invention due to the fact that
(d) the closing member is constructed as a closing flap, which comprises;
(da) an attachment section able to be fixed to the housing;
(db) a closing section adjoining the attachment section, which closing section can be tilted in the manner of a hinge through a certain angle between a first position, in which it closes the ventilation passage, and a second position, in which it closes the inlet pipe.

In this embodiment of the pipe interrupter according to the invention, the chamber inside the housing may be provided geometrically particularly simply with smooth walls. The pipe connection to the chamber corresponds in an unconstrained manner to the factors to be found in a sanitary fitting. The space requirement is correspondingly small. On the other hand, the sensitivity of response of the closing section is high, since only low hinge forces are necessary for its tilting and an elastic expansion must not occur.

If, without reduced pressure in the inlet pipe, the closing section bears in an elastic resilient manner against the opening aperture of the ventilation passage into the chamber, when raising a shower head flexible hose connected to the outlet pipe, water contained therein is prevented from emerging from the ventilation aperture.

In a particular embodiment of the invention it is provided that a groove is disposed on the transition line between the attachment section and the tiltable closing section of the closing flap. Due to this, the axis about which the tilting movement of the closing section should take place, is defined precisely and the tilting movement itself is facilitated.

The closing flap may be produced as a whole from resilient material; this elasticity then serves both for the formation of the hinge as well as of the seal.

As an alternative, the closing section of the closing flap may also be produced from a hard core, which comprises resilient overlays on both sides. The resilient overlays then take care of sealing, whereas the hinge to be produced separately facilitates the tilting capacity.

The closing section may also be made as a whole from hard material, if the opening points of the ventilation passage and of the inlet pipe into the chamber are surrounded by resilient seals.

Embodiments of the invention are described in detail hereafter with reference to the drawings, in which.

Figures 1, 2A, 2B:
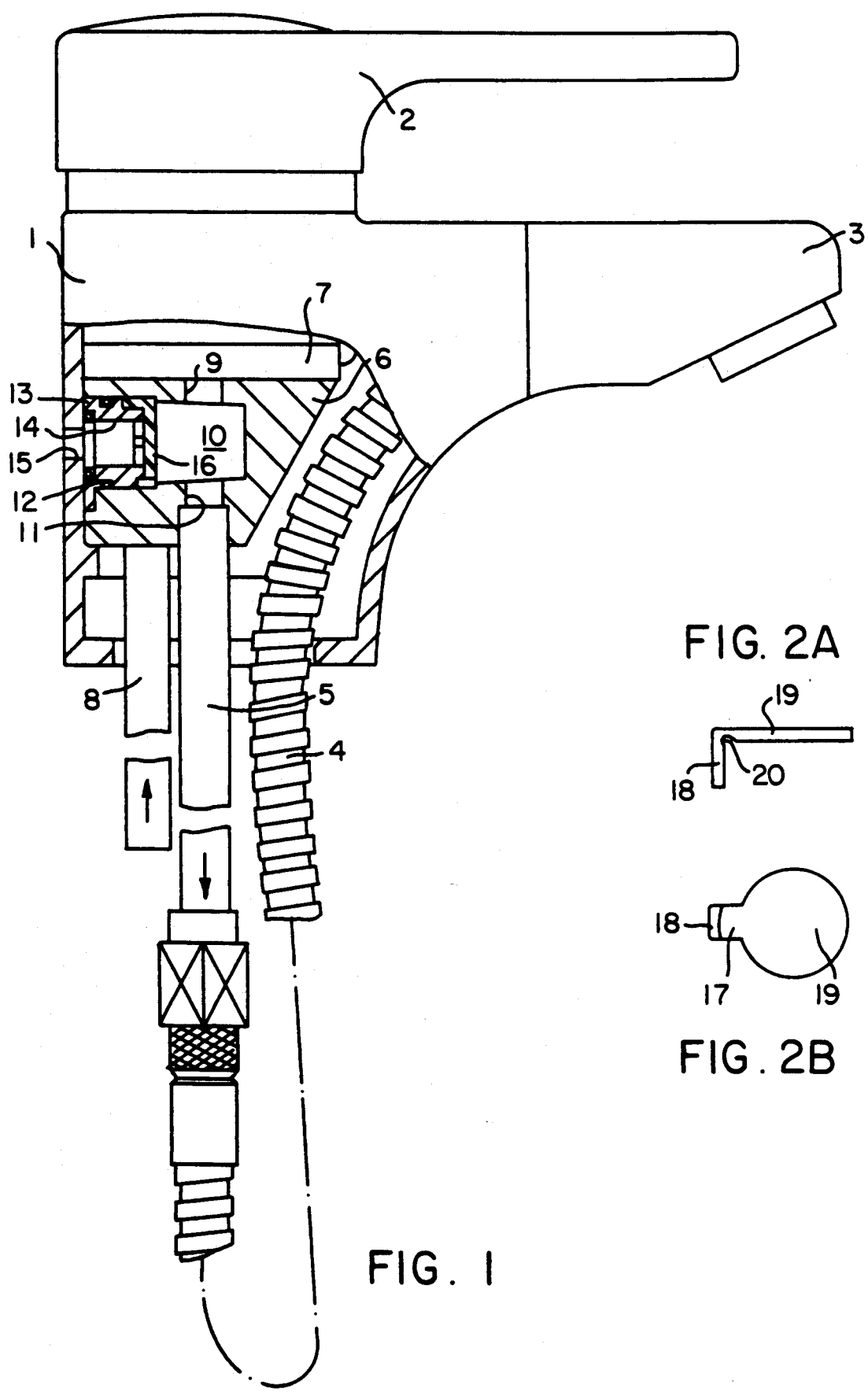
FIG. 1 is a side view of a sanitary fitting with installed pipe interrupter, partly in section.
FIG. 2a is a side view of the closing flap in the pipe interrupter of FIG. 1.
FIG. 2b is an underneath view of the closing flap of the pipe interrupter of FIG. 1.

The sanitary fitting illustrated in FIG. 1 comprises in known manner a fitting body 1, an operating lever 2 which is able to rotate and tilt as well as an outlet mouthpiece 3 which can be pulled out. The latter is connected by way of a shower head flexible hose 3 arranged in a loop, which is guided partly inside the fitting body 1 and partly through the hole of the washbasin to be imagined below the sanitary fitting, to an outlet pipe 5. The outlet pipe 5 is fastened in a base part 6, which rests on an inner step of the fitting body 1. The base part 6 supports a control cartridge 7, which can be constructed in known manner and in which the control elements necessary for controlling the water stream or streams are combined. These control elements are moved in a suitable manner by means of the handle 2. Two inlet pipes 8 for cold or hot water likewise extend through the hole in the basin and from below into the fitting body 1. They pass through the base part 6 and communicate in known manner with the control cartridge 7.

The mixed water delivered by the control cartridge 7 according to the relative position of the control elements passes by way of a short pipe 9 into a somewhat enlarged chamber 10 and from there by way of a pipe 11, which coaxially continues the pipe 9, to the outlet pipe 5 and from there to the outlet mouthpiece 3 which can be pulled out.

Inserted from the side in the chamber 10 is a pipe interrupter, which bears the general reference numeral 12. It comprises a hollow, cylindrical insert 13, which is sealed by means of O-ring seals against the side wall of the chamber 10 in the base part 6 and against the inner wall of the fitting body 1. The interior 14 of the hollow, cylindrical insert 13 is connected by way of a bore 15 to the outside atmosphere.

Under normal conditions, i e. as long as no reduced pressure prevails in the pipe system connected to the inlet pipes 8, the interior 14 of the insert 13 is closed with respect to the internal region of the chamber 10 by a closing flap 16. The latter is shown to an enlarged scale in FIG. 2a in side view and in FIG. 2b in underneath plan view. It consists of resilient material, preferably rubber or a comparable synthetic material. It comprises an attachment section 18 formed on a lateral lug 17 (see FIG. 2b) and which is bent substantially at an angle of 90° as well as a closing section 19 having a circular shape in the underneath plan view. A groove 20 extends at the boundary line between the attachment section 18 and the lateral lug 17, which groove at this point forms a type of hinge between the two sections 18 and 19.

As can be seen in FIG. 1, the attachment section 18 of the closing flap 16 is clamped between the outer wall of the insert 13 and the inner wall of the chamber 10, whereas the closing section 19 of the closing flap 16 may tilt about the hinge formed by the groove 20, between the position illustrated in full line and the position illustrated in dot-dash line.

The method of operation of the pipe interrupter described within the illustrated sanitary fitting is as follows:

Normal operation means a condition of the sanitary fitting in which no reduced pressure prevails in the pipe system enclosing the inlet pipes 8. Under these conditions, the closing section 19 of the closing flap 16 bears with slight resilient pressure against the righthand front face of the insert 13 in FIG. 1 and in this case prevents both the inlet of air from the external atmosphere into the inner region of the chamber 10 as well as the escape of water from the inner region of the chamber 10 through the ventilation bore 15 in the fitting housing 1. The latter is particularly important if, when the loop of the shower head flexible hose 4 is still filled with water, the mouthpiece 3 is removed and raised. Without the closing flap 16 bearing against the insert 13, the water still contained in the loop of the shower head flexible hose 14 would flow out of the ventilation bore 15.

If, in exceptional circumstances in the pipe system, which is connected to the intake pipes 8, reduced pressure occurred, then the closing section 19 of the closing flap 16 tilts through approximately 90°, until it closes off the pipe 9 - as shown in dot-dash lines in FIG. 1 -. Due to this, water is first of all prevented from flowing back into the control cartridge and from there possibly even into the inlet pipes 8 and the connected pipe system. At the same time, the inlet of air through the ventilation bore 15 of the fitting housing 1 and the interior 14 of the insert 13 into the right-hand region of the chamber 10 in the drawing is released, so that thus, this region of the chamber 10 and the subsequent flow paths (outlet pipe 5, shower head flexible hose 4, outlet mouthpiece 3) are ventilated.

As soon as the pressure in the water inlet pipe 8 once more returns to its normal value, on account of its inherent elasticity, the closing section 19 of the closing flap 16 once more returns to its normal position, which is shown in full line in FIG. 1.

Figure 3:
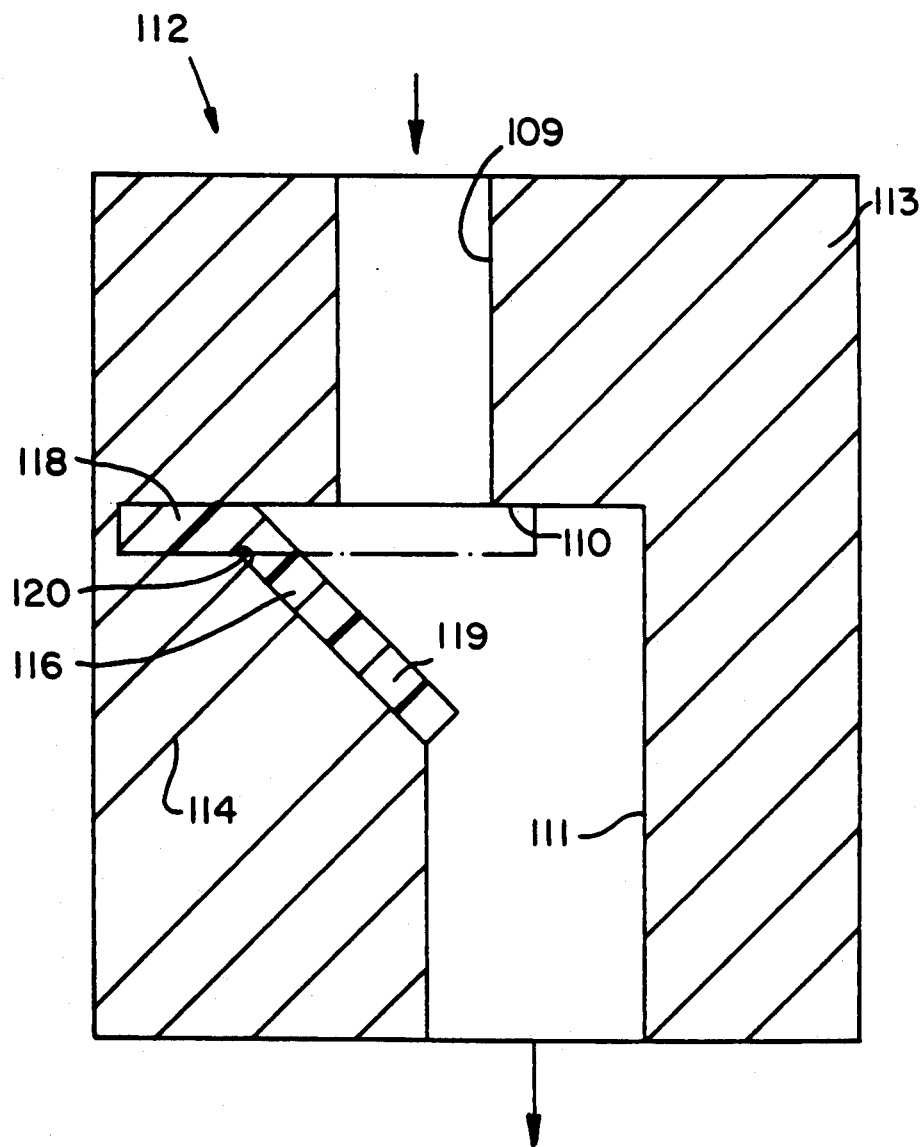
FIG. 3 is a second embodiment of a pipe interrupter for installation in the sanitary fitting illustrated in FIG. 1.

FIG. 3 shows a second embodiment of a pipe interrupter, the construction of which corresponds largely to that described above. Corresponding components are therefore characterised by the same reference numerals plus 100.

The pipe interrupter 112 illustrated in FIG. 3 comprises an insert 113, which with the incorporation of corresponding seals can be inserted in a similar manner in a base part of a sanitary fitting, as was the case in the embodiment of FIG. 1. In this case, the insert 113 of the pipe interrupter of FIG. 3 comprises a pipe 109, to which the mixed water emerging from the control cartridge is supplied. The pipe 109 opens into an inner chamber 110 of the insert 113, into which a pipe 111 also opens in an axis parallel manner and at an obtuse angle with respect to the pipe 109 a ventilation passage 114.

Once again a closing flap 116 is provided, which comprises an attachment section 118 as well as a closing section 119. According to the different geometry of the pipes 109, 114 in the insert 113, the sections 118 and 119 of the closing flap 116 however enclose an obtuse angle. A groove 120 is again located at the transition region between the attachment section 118 and the closing section 119, which groove assists the hinge action of this region.

The method of operation of the pipe interrupter illustrated in FIG. 3 corresponds to that of the embodiment of FIG. 1 completely, if one disregards the fact that the tilting region of the closing section 119 in the embodiment of FIG. 3 is smaller than in the embodiment of FIG. 1.

In one embodiment not shown in the drawing, the closing section of the closing flap is produced from hard material. On both sides it supports resilient overlays, which ensure the seal with respect to the opening apertures of the ventilation passage and of the inlet pipe. As an alternative to these resilient overlays, the opening apertures can also be surrounded by resilient seals. In both cases, the hinge then only needs to be resilient and/or flexible, due to a corresponding spring device, care having to be taken that under normal circumstances the closing section bears against the opening point of the ventilation passage into the chamber.

I claim:

1. Sanitary fitting comprising
   (a) a fitting body (1) having a base part (6);
   (b) an outlet mouthpiece (3) which can be pulled out and which is connected by way of a flexible hose (4) to an outlet pipe (5) fastened in said base part (6), said flexible hose being arranged in a loop which is guided partly inside said fitting body (1);
   (c) control elements (7) inside said fitting body (1) for controlling the water flow through said fitting;
   (d) a chamber (10) provided in said base part (6) and opening into said chamber an inlet pipe (9) for water coming from said control elements (7), said outlet pipe (5) and a ventilating passage (14);
   (e) a hollow, cylindrical insert (13) inserted into said chamber (1) from the side and sealed against the wall of said chamber (10);
   (f) a closing flap (16) mounted in said chamber (1) which, in the event of a reduced pressure in the inlet pipe (9), both closes the inlet pipe (9) and opens the ventilation passage (14), said closing flap (16) being formed from a single piece of resilient elastic material that includes (1) an attachment section (18) that is secured by said insert (13) in a fixed position at the wall of said chamber (10);

(2) a single planar closing section (19) joined to and extending outwardly in a single plane from said attachment section (18), which closing section is movable in the manner of a hinge through an angle extending between a first position in which it bears against and by itself covers and closes off said ventilation passage (14) solely by virtue of its elastic resilient when there is no reduced pressure in said inlet pipe (9), and a second position in which said elastic resiliency of the single planar closing section (19) that biases it against said ventilation passage (14) is overcome by reduced pressure in the inlet pipe (9) and the single planar closing section (19) moves through a single arc to a position where it by itself covers and closes off said inlet pipe (9).

2. A device according to claim 1 wherein said closing flap (16, 116) includes a groove (20, 120) at the transition line between the attachment section (18, 118) and the closing section (19, 119).

3. A device according to claim 1 wherein said closing flap (16, 116) is formed so that the attachment section (18, 118) is at a right angle relative to said closing section (19, 119).

* * * * *